June 20, 1950 — J. M. LIPTAY — 2,512,108
ISLAND STRIP SUPPORT
Filed Feb. 1, 1947 — 2 Sheets-Sheet 1
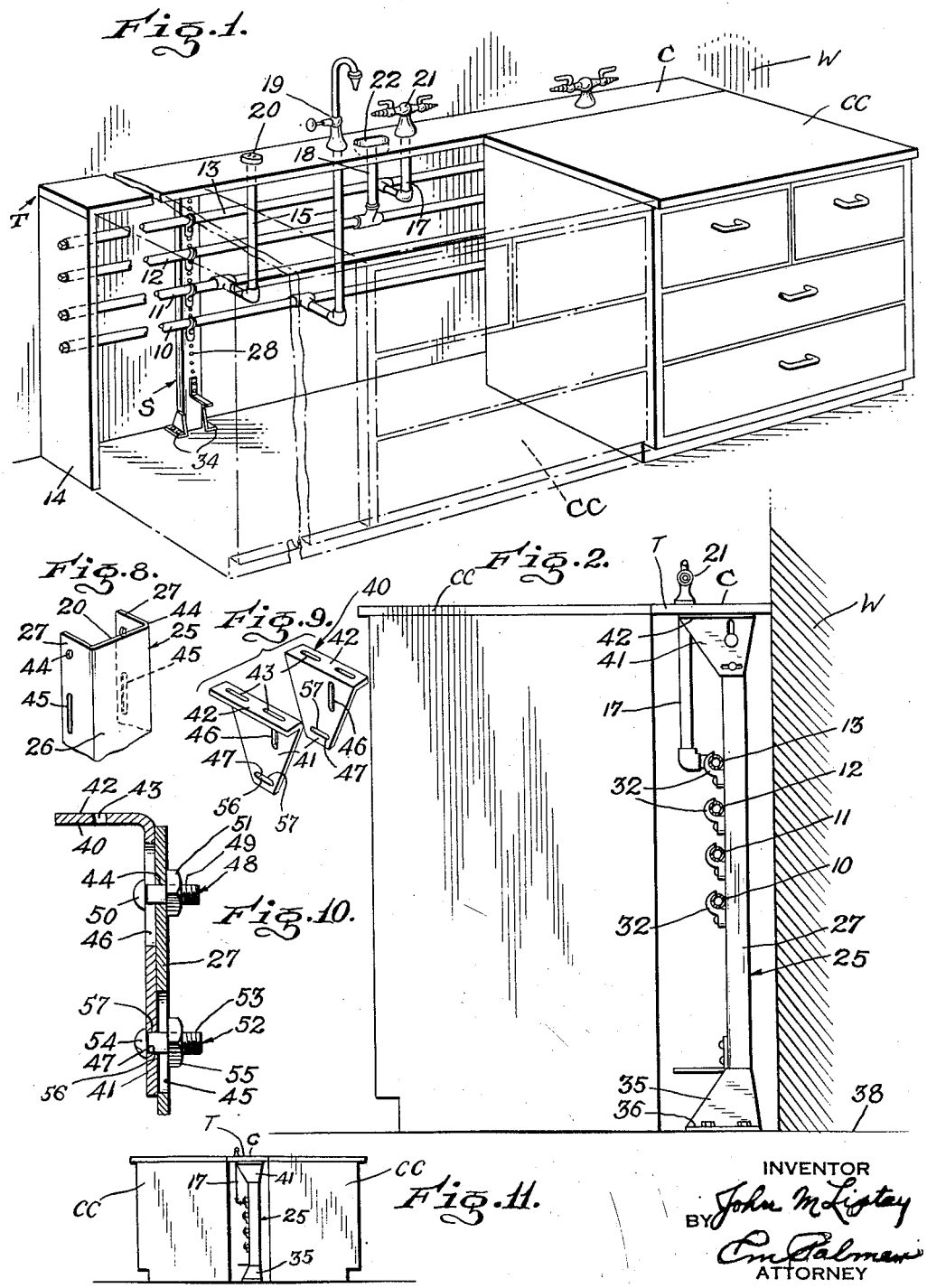
INVENTOR
John M. Liptay
BY
ATTORNEY

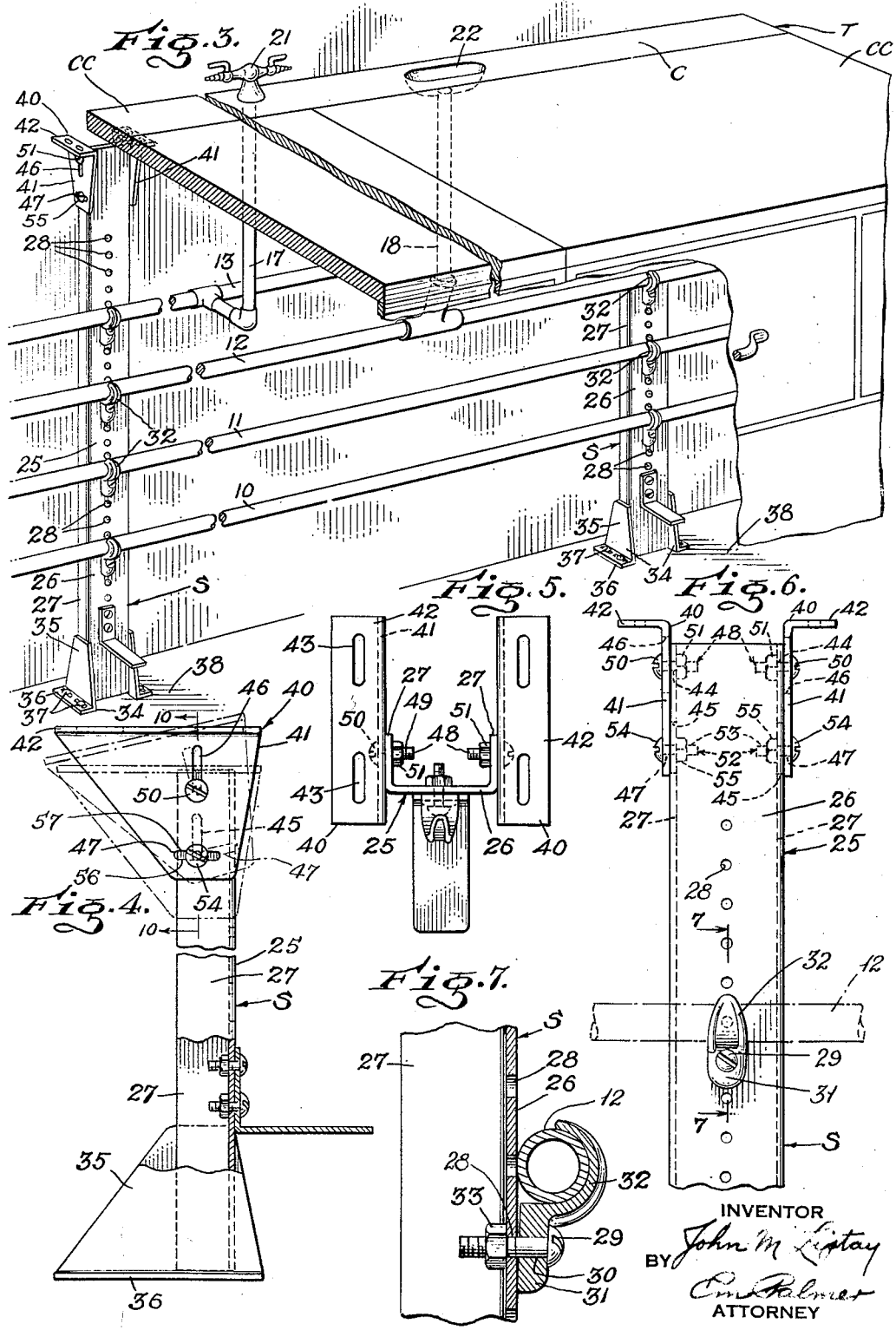

Patented June 20, 1950

2,512,108

UNITED STATES PATENT OFFICE 2,512,108

ISLAND STRIP SUPPORT

John M. Liptay, Scarsdale, N. Y., assignor to Laboratory Furniture Company, Inc., Long Island City, N. Y., a corporation of New York Application February 1, 1947, Serial No. 725,915

11 Claims. (Cl. 248—68)

The subject matter of this invention is a novel rack for desirably sustaining water, gas, steam, and other fluid conducting piping or electrical conduits and for supporting a counter or island strip from which extends appropriately accessible conveniently controlled connections operatively joined to the piping and electrical conduits concealed within the counter. More specifically the invention is concerned with an improved pipe and/or conduit sustaining island strip adapted to be employed in association with diversified types of industrial cabinets. Usually the piping and conduit assembly is mounted adjacent a wall of the laboratory and the cabinet is disposed in front of and to conceal the piping and conduit assembly. Hitherto with this type of arrangement the cabinet was customarily provided at the rear wall thereof with a suitable door to permit access to the piping and conduit assembly to allow for installation, inspection and servicing thereof. This type of arrangement led to certain inconveniences in that the plumber or electrician was compelled to work through the cabinet in the matter of making the proper association of piping and conduit assembly with the respective connections leading downwardly from the counter. Broadly the object of the invention resides in the provisions of means to facilitate the work of the plumber or electrician in the utilization of a serviceable and improved island strip wherein the required plumbing and electrical connections of the piping and conduit assembly on the island strip are first made directly thereon without working through the cabinet and before the latter is placed against the island strip for effectively concealing the pipe and conduit assembly. Specifically another object of the invention is realized in the provision of a novel stanchion having tiltably and slidably secured thereto spaced brackets for supporting at least in part the top panel of the island strip. Another specific object is to provide primary and supplementary means for slidably guiding the spaced brackets on spaced sides of the stanchion. A further object resides in the provision of a bolt slidably guided within a vertically disposed elongated gap in a side of the stanchion and projecting through a horizontally arranged elongated slot in a bracket and adapted to be bodily but severally actuated by the spaced horizontal walls of the horizontal slot upon displacement of the bracket linearly relative to the stanchion and adapted in cooperation with the spaced horizontal walls to rotate or tiltably guide the displacement of the bracket. Other important objects and advantages will appear from the following detailed description considered in the light of the accompanying drawings wherein:

Fig. 1 is a perspective fragmentary and broken view of the rack or island strip support according to the invention, shown supporting appropriate piping having outlet connections above the counter or island strip underneath which one or more racks are arranged.

Fig. 2 is a side view of Fig. 1 illustrating a cabinet disposed against an island strip.

Fig. 3 is an enlarged broken and fragmentary view of Fig. 1.

Fig. 4 is a side elevational view of one of the stanchions of the rack or island strip support shown partly in section.

Fig. 5 is a plan view of Fig. 4.

Fig. 6 is a fragmentary and enlarged front elevational view of Fig. 4.

Fig. 7 is a vertical sectional view on the line 7—7 of Fig. 6.

Fig. 8 is a fragmentary perspective view of the upper portion of one of the stanchions.

Fig. 9 is a perspective view of the spaced, tiltable and slidably guided brackets adapted to be mounted at an upper portion of a stanchion.

Fig. 10 is an enlarged vertical sectional view on the line 10—10 of Fig. 4, and

Fig. 11 is a side elevational view of an island strip according to the invention shown removably straddled by a pair of industrial cabinets.

According to the invention spaced stanchions S are utilized to sustain the piping or conduits 10, 11, 12 and 13 disposed under a counter or island strip T comprising a top panel C supported by legs 14 through which the piping and conduit assembly may pass. The piping 10 and 13 may conduct water and gas to the subpiping 15 and 17 respectively fitted through panel C and having suitable outlet controls 19 and 21. Pipe 12 also a part of the piping system is connected to a suitable outlet drain 22. As is well understood even an electrical conducting cable schematically shown at 11 is also mounted on the stanchions and is connected to a suitable outlet plug 20 accessible above the panel C.

Specifically however each stanchion S comprises a vertically disposed U or channel shaped column 25 having a web 26 provided with spaced rearwardly extending flanges 27.

Web 26 embodies a plurality of spaced perforations 28 for receiving the partly threaded shanks of the screws 29 also passing through openings 30 of the depending lips 31 of the pipe supporting cleats 32. An adjustable clamping member 33 is utilized to hold a cleat in position to properly guard and retain the pipe on the stanchion.

Spaced feet or angle irons 34 have their upstanding arms 35 welded to the side flanges 27 of a column 25 while their laterally extending flanges 36 have suitable spaced slots as shown for reception of bolts 37 for removably anchoring the angle irons to the flooring 38.

Slidably and pivotally or tiltably associated with the upper part of each column 25 and straddling the latter are a pair of brackets each broadly designated 40 and each comprising a tapered and rectilinear leg 41 having an outwardly or laterally extending upper flange 42 each provided with spaced slots 43 adapted to receive suitable screws or the like not shown for attachment to the top panel C.

At the upper parts of the rearwardly extending flanges of each column 25 are the horizontally alined apertures or openings 44 and below these openings are the horizontally alined slots or gaps 45.

Each depending leg 41 is provided with a vertically disposed slot or passageway 46 arranged above and spaced from a lower horizontally arranged slot 47 substantially normal to the gap or passageway 46.

A fulcrum pin in the form of a screw or bolt generally indicated 48 has its shank 49 removably projecting through a circular aperture or opening 44 and a companion vertical slot or passageway 46 in an associated depending leg 41 of an adjacent bracket. The head 50 of a screw is larger than the width of the vertical passageway 46 and thus when leg 41 of a bracket is clamped against the column 25 by nut or member 51, leg 41 is firmly retained between head 50 and an adjacent flange 27.

Running bolts or screws each broadly denoted 52 have their partly threaded shanks 53 projecting through both a horizontal slot 47 in a leg 41 of an adjacent bracket 40 and in a vertical slot 45 of the column. In fact shanks 53 are vertically guided by the spaced vertical walls of the slots 45. The heads 54 of shanks 53 are appreciably larger than the width of the horizontal slots 47 and consequently when nuts 55 are tightened legs 41 are clamped in a set position against the column.

To adjust a bracket 40 relative to the column corresponding nuts 51 and 55 are first unloosened. Thus a bracket may be bodily, rectilinearly and vertically displaced relative to the column 25 of a stanchion S.

The upper shank 49 although removable at this time remains in the aperture 44 and is closely but slidably straddled by the walls of the elongated vertical gap or slot 46. On elevating a bracket 40 relative to the column 25 at a time when its clamping members or nuts 51 and 55 are unloosened, the horizontal bottom wall 56 of the elongated slot 47 abuts the lower shank 53, raising the latter within the companion slot 45 of a contiguous flange or side 27 although at this time the vertical and spaced walls of the upper vertical passageway 46 in the shifted bracket are vertically raised and always closely but movably straddle the upper fulcrum pin or shank 49. Thus a bracket 40 may be linearly adjusted to dispose its flange 42 against the top panel C of the island strip or counter T prior to fastening these parts together after which the nuts 51 and 55 of the adjusted bracket are clamped against column 25 thereby holding this bracket in a set position to support the top panel C.

If it is desired to lower the bracket relative to its column 25, the clamping members or nuts are loosened, and the bracket is shifted manually downwardly. This action causes the upper wall 57 of the elongated slot 47 to actuate and displace the lower slidably guided shank or pin 53 downwardly in its companion vertical gap 45 and the upper vertical passageway 46 at this time is also displaced downwardly relative to the upper fulcrum and guide pin or shank 49. With the bracket 40 lowered in a desired position, it is clamped in such position as is well understood.

Upward displacement of a bracket 40 is limited by the coaction of its slidably guided lower shank or stud 53 striking the upper end of the lower gap 45 in the column at which time lower end of the upper vertical passageway 46 moves against the upper fulcrum pin 49.

The lower wall of a gap 45 of the column cooperates with the companion slidable lower stud 53 to limit downward displacement of its associated bracket at which time the upper end of passageway 46 is resting on the upper fulcrum pin 49.

Each bracket when unloosened may also be tilted or pivoted relative to the column 25 or to a side or flange 27 thereof and hence may be adjusted to hold the top panel C level. In this connection it is apparent that irrespective of the position of the running or slidably guided lower stud or shank 53 in the companion lower gap 45 and regardless of the position of the upper vertical slot or passageway 46 relative to the upper stud or shank 49, the latter serves as fulcrum means for the spaced sides or bearings of the upper vertical slot 46 whereby the body of the bracket may be rotatably inclined or biased relative to the column in that the lower slot 47 serves as relief means to permit lateral displacement of leg 41 in either direction within the limits of slot 47 and relative to its companion flange 27. Thus irregularities due to unevenness of the flooring 38 may be compensated for. Of course after the brackets are located in their selected and inclined positions they are secured to the top panel as earlier set forth herein.

Briefly recapitulating, each stanchion S is adapted to tiltably sustain two brackets 40 adapted to be secured to the panel C of the island strip. The spaced stanchions constitute spaced racks for supporting the piping and conduit assembly. Each stanchion carries fulcrum means or screws as 48 slidably guiding a bracket and each bracket sustains carrier means or bolts as 52 slidably guided in an adjacent side or flange 27 of a stanchion and although the carrier means may be vertically displaced it is susceptible in cooperation with the spaced horizontal walls of the relief gap or slot 47 to permit tiltable displacement of the bracket relative to the column upon pivotal displacement of the bracket in respect to the upper fulcrum means or pin 48. In actual practice two stanchions are employed for every five feet of the piping and conduit assembly.

In Fig. 1 the island strip T is disposed against a fixed wall W of a room, and one or more industrial cabinets CC is placed in front and against the island strip. With this type of arrangement, if the piping and conduit assembly requires repair or other servicing, the cabinets may be set to one side of the island strip and thus prompt access is had to the piping and conduit assembly without any need of working through the cabinets.

In Fig. 11, the island strip is straddled by two cabinets CC and hence direct access may be had thereto by shifting one or the other of the cabinets or both away therefrom.

The spaced vertical walls of the vertical passageway 46 in cooperation with the screws of fulcrum means 48 may be said to characterize primary means for slidably guiding a bracket linearly of its stanchion. A linearly displaceable bolt 52 in association with the spaced vertical walls of the vertical gap 45 constitute secondary means for slidably guiding the bracket which in the unclamped relation of the nuts 51 and 55 may be swung or pivoted against the fulcrum means 48 due to the relief slot 47 whose upper and lower sides movably straddle the running bolt or carrier means 52.

Various changes may be made in details of construction and arrangement of parts without departing from the spirit of the invention or sacrificing any of the advantages thereof inherent therein.

I claim:

1. A stanchion for supporting a panel, comprising; a column including an aperture and a vertically disposed gap spaced from said aperture, a bracket having a vertically disposed passageway in alinement with said aperture and having a substantially horizontally arranged elongated slot spaced from said passageway and in part in alinement with said gap, a screw having a shank disposed within said passageway and aperture and cooperating with the spaced vertical walls of said passageway to slidably guide said bracket in respect to said column and having a head adapted to abut said bracket, a rotatable member mounted on said shank for removably clamping said bracket against said column, a bolt having a stud disposed within said gap and slot and slidably guided by the spaced vertical walls of said gap relative to said column and severally cooperating with the upper and lower substantially horizontally disposed walls of said slot on shifting thereof relative to said column in the unclamped relation of said rotatable member, and a nut removably carried by said stud for disengageably clamping said bracket to said column.

2. A stanchion for supporting a panel, comprising; a column including an aperture and a vertically disposed gap arranged below and spaced from said aperture, a bracket having a vertically disposed passageway in alinement with said aperture and having a substantially horizontally arranged elongated slot arranged below and spaced from said passageway and in part in alinement with said gap, a screw having a shank disposed within said passageway and aperture and cooperating with the spaced vertical walls of said passageway to slidably guide said bracket in respect to said column and having a head adapted to abut said bracket, a rotatable member mounted on said shank for removably clamping said bracket against said column, a bolt having a stud disposed within said gap and slot and slidably guided by the spaced vertical walls of said gap relative to said column and severally cooperating with the upper and lower substantially horizontally disposed walls of said slot on shifting thereof relative to said column in the unclamped relation of said rotatable member, and a nut removably carried by said stud for disengageably clamping said bracket to said column.

3. A stanchion for supporting a panel, comprising; a column including an aperture and a vertically disposed gap spaced from said aperture, a bracket having a vertically disposed passageway in alinement with said aperture and having a substantially horizontally arranged slot spaced from said passageway and in part in alinement with said gap, a screw having a shank disposed within said passageway and aperture and cooperating with the spaced vertical walls of said passageway to slidably guide said bracket in respect to said column and having a head adapted to abut said bracket, a rotatable clamping member mounted on said shank for removably holding said bracket against said column, a bolt having a stud disposed within said gap and slot and slidably guided by the spaced vertical walls of said gap relative to said column and severally cooperating with the upper and lower substantially horizontally disposed walls of said slot on shifting thereof relative to said column in the unclamped relation of said rotatable member, and a clamping nut removably carried by said stud for disengageably holding said bracket to said column, said shank in the unclamped relation of said member and nut characterizing fulcrum means cooperating with said spaced vertical walls for tilting said bracket relative to said column.

4. A stanchion for supporting a panel, comprising; a column including an aperture and a vertically disposed gap spaced from said aperture, a bracket having a vertically disposed passageway in alinement with said aperture and having a substantially horizontally arranged slot spaced from said passageway and in part in alinement with said gap, a screw having a shank disposed within said passageway and aperture and cooperating with the spaced vertical walls of said passageway to slidably guide said bracket in respect to said column and having a head adapted to abut said bracket, a rotatable member mounted on said shank for removably clamping said bracket against said column, a bolt having a stud disposed within said gap and slot and slidably guided by the spaced vertical walls of said gap relative to said column and severally cooperating with the upper and lower substantially horizontally disposed walls of said slot on shifting thereof relative to said column in the unclamped relation of said rotatable member, a clamping nut removably carried by said stud for disengageably holding said bracket to said column, said shank in the unclamped relation of said member and nut characterizing fulcrum means cooperating with said vertical walls for tilting said bracket relative to said column, and said slot having end walls severally cooperating with said stud to limit tilting of said bracket relative to said column.

5. A stanchion for supporting a panel, comprising: a column having a rearwardly disposed flange and including an aperture and a vertically disposed gap spaced from said aperture, a bracket having a vertically disposed passageway in alinement with said aperture and having a substantially horizontally arranged slot spaced from said passageway and in part in alinement with said gap, a screw having a shank disposed within said passageway and aperture and cooperating with the spaced vertical walls of said passageway to slidably guide said bracket in respect to said flange and having a head adapted to abut said bracket, a rotatable member mounted on said shank for removably clamping said bracket against said flange, a bolt having a stud disposed within said gap and slot and slidably guided by the spaced vertical walls of said gap relative to said column and severally cooperating with the upper and lower substantially horizontally disposed walls of said slot on shifting thereof relative to said flange in the unclamped relation of said rotatable member, and a nut removably carried by said stud for disengageably clamping said bracket to said flange.

6. A stanchion for supporting a panel comprising; a column having a web and spaced rearwardly extending flanges each including an aperture and a vertically disposed gap spaced from said aperture, spaced brackets each having vertically disposed passageways in alinement with said apertures and having substantially horizontally arranged slots spaced from said passageways and in part in alinement with said gaps, screws having shanks disposed within said passageways and apertures and cooperating with the spaced vertical walls of said passageways to slidably guide said brackets in respect to said column and having heads adapted to abut said brackets, rotatable members mounted on said shanks for removably clamping said brackets against said flanges, bolt means having studs disposed within said gaps and slot and slidably guided by the spaced vertical walls of said gaps relative to said column and severally cooperating with the upper and lower substantially horizontally disposed walls of said slots on shifting thereof relative to said flanges in the unclamped relation of said rotatable members, and nuts removably carried by said studs for disengageably clamping said brackets to said flanges.

7. A stanchion adapted to support a panel of an island strip, comprising; a column, spaced brackets straddling said column, said brackets and column having means for vertically sliding said brackets relative to said column, and said column and brackets having means to allow tiltable displacement of said brackets relative to said column and panel.

8. A stanchion adapted to support a panel of an island strip, comprising; a column, spaced brackets straddling said column, said brackets and column having means for vertically sliding said brackets relative to said column, said column and brackets having means to allow tiltable displacement of said brackets relative to said column and panel, and means for removably clamping said brackets to said column.

9. A stanchion for supporting a panel, comprising; a column including an aperture and a vertically disposed gap spaced from said aperture, a bracket having a vertically disposed passageway in alinement with said aperture and having an elongated relief slot spaced from said passageway and substantially normal thereto and in part in alinement with said gap, a shank disposed within said passageway and aperture and cooperating with the spaced vertical walls of said passageway to slidably and vertically guide said bracket in respect to said column, and a stud disposed within said gap and slot and linearly guided by the spaced vertical walls of said gap relative to said column and severally cooperating with the upper and lower walls of said slot on shifting thereof relative to said column for vertically displacing said bracket relative to said column.

10. A stanchion for supporting a panel, comprising; a column including an aperture and a vertically disposed gap spaced from said aperture, a bracket having a vertically disposed passageway in alinement with said aperture and having an elongated relief slot spaced from said passageway and substantially normal thereto and in part in alinement with said gap, a shank disposed within said passageway and aperture and cooperating with the spaced vertical walls of said passageway to slidably and vertically guide said bracket in respect to said column, a stud disposed within said gap and slot and linearly guided by the spaced vertical walls of said gap relative to said column and severally cooperating with the upper and lower walls of said slot on shifting thereof relative to said column for vertically displacing said bracket relative to said column, and said shank cooperating with the vertical walls of said passageway on tilting of said bracket relative to said column at which time said relief slot is tiltably displaced relative to said stud.

11. A stanchion for supporting a panel, comprising; a column including an aperture and a vertically disposed gap in alinement with and spaced from said aperture, a bracket having a vertically disposed passageway in alinement with said aperture and having an elongated relief slot spaced from said passageway and substantially normal thereto and in part in alinement with said gap, a shank disposed within said passageway and aperture and cooperating with the spaced vertical walls of said passageway to slidably and vertically guide said bracket in respect to said column, a stud disposed within said gap and slot and linearly guided by the spaced vertical walls of said gap relative to said column and severally cooperating with the upper and lower walls of said slot on shifting thereof relative to said column for vertically displacing said bracket relative to said column, said shank constituting fulcrum means cooperating with the vertical walls of said passageway on tilting of said bracket relative to said column at which time said relief slot is tiltably displaced relative to said stud, and means on said stud and shank for clamping said bracket against displacement relative to said column.

JOHN M. LIPTAY.

REFERENCES CITED

The following references are of record in the file of this patent:

UNITED STATES PATENTS

| Number | Name | Date |
|---|---|---|
| 1,087,302 | Kobert | Feb. 17, 1914 |
| 1,528,034 | Thielmann | Mar. 3, 1925 |
| 1,756,716 | Whitney | Apr. 29, 1930 |
| 2,453,254 | Odin | Nov. 9, 1948 |